United States Patent [19]

David

[11] Patent Number: 4,473,542

[45] Date of Patent: Sep. 25, 1984

[54] PRODUCTION OF MICROCRYSTALLINE FERRIMAGNETIC SPINELS

[75] Inventor: Lawrence D. David, Florham Park, N.J.

[73] Assignee: Celanese Corporation, New York, N.Y.

[21] Appl. No.: 497,345

[22] Filed: May 23, 1983

[51] Int. Cl.³ .................. C01G 9/00; C01G 49/00; C01G 53/00
[52] U.S. Cl. ................................. 423/594; 252/62.62
[58] Field of Search .................. 423/594; 252/62.62

[56] References Cited

U.S. PATENT DOCUMENTS 3,438,723  4/1969  Pechini ........................... 423/594
3,549,315  12/1970  Lester et al. .................... 423/594

FOREIGN PATENT DOCUMENTS 1089564  3/1955  France ........................... 252/62.62

OTHER PUBLICATIONS

Koppens, "Science of Ceramics-British Ceramic Soc.", Stoke-on-Trent, England, 1976, pp. 101-109.
Oda et al., "Journal of Japan Soc. of Powder & Powder Metallurgy", 29, (5), 1982, pp. 170-175.
Suwa et al., "Proceedings of International Conf.-Ferrites", Sep.-Oct., Japan, 1980, pp. 23-26.
Baythoun et al., "J. of Materials Sci.", 17, 1982, pp. 2757-2769.
Anderton et al., "Powder Metallurgy", #1, 1979, pp. 14-21.

Primary Examiner—Herbert T. Carter
Attorney, Agent, or Firm—Depaoli & O'Brien

[57] ABSTRACT

This invention provides an improved process for producing a microcrystalline ferrimagnetic spinel via an amorphous organometallic precursor.

The process produces a high purity ferrite powder such as $Ni_{0.7}Zn_{0.3}Fe_2O_4$ which has an average particle size less than about 1000 angstroms.

12 Claims, No Drawings

PRODUCTION OF MICROCRYSTALLINE FERRIMAGNETIC SPINELS

BACKGROUND OF THE INVENTION

Finely divided oxide powders are useful in the manufacture of coating compositions, intricately shaped and fine-grained ceramics, cermets, and the like. Small particles are particularly important in the preparation of powder mixtures. In general, the smaller the particle size, the more uniform are the compositions and the better the mechanical properties of metal, ceramic, and cermet articles prepared from the powder mixtures.

Of particular concern for purposes of the present invention are processes for the production of finely divided magnetic particles, i.e., particulate materials that an applied magnetic field can induce to change from a nonmagnetized condition (exhibiting no external fields) into a magnetized condition (exhibiting external fields), and which after removal of the applied magnetic field remain at least partially magnetized in the sense of continuing to exhibit external fields.

As described in U.S. Pat. No. 3,425,666, conventional ferrimagnetic material production involves preparation of polycrystalline magnetic materials in two main steps: (a) preparation of a mixture, as uniform as possible, of the nonferrimagnetic starting materials, and (b) conversion of said starting materials at an elevated temperature to produce the desired ferrimagnetic material by solid state reaction. An example is the solid state reaction of NiO with $Fe_2O_3$ at an elevated temperature, to produce the nickel ferrite, $NiFe_2O_4$.

In this type of solid state reaction the starting materials generally are prepared in powdered form, placed together, and heated. The heating causes a mutual diffusion of constituents of each starting material and the growth of a crystallite of the desired ferrimagnetic spinel. When the resulting material is needed commercially in solid form, usually the material is powdered again. Thereafter, if a solid shape is desired, the powder is formed into the selected shape and sintered.

Generally the starting materials in the oxide form are mixed together in the desired proportions by dry or wet ball milling. After the milling the material is heated to 500°–800° C., and the resulting material is crushed and milled again. This process can be further repeated to obtain additional homogeneity.

Another procedure involves the decomposition method, in which the starting materials are mixed by milling in the salt form instead of the oxide form, and then the salts are converted to the oxides by thermal decomposition in air.

Another procedure involves the precipitation method, which has been utilized in an attempt to avoid the lengthy milling process of the oxide and decomposition methods. The objective is to precipitate from a solution the required materials simultaneously in either a hydroxide or oxalate form to yield a precipitate containing the required metal hydroxides or metal oxalates in the correct proportions intimately mixed.

The above described oxide, decomposition, and precipitation methods involve various disadvantages. In the oxide and decomposition methods the lengthy ball milling that is required is a disadvantage. Even with extended ball milling there is room for much improvement in the homogeneity of the resulting mixture.

The precipitation methods directionally improve mixture homogeneity, but entail other disadvantages. For example, when a strong base such as sodium hydroxide is used to cause precipitation, the cation must be removed from the resulting mixture to purify it, and this can present a difficult purification problem.

U.S. Pat. No. 3,822,210 describes a process for producing fine spinel-type ferrite particles which are highly dispersible. Spinel-type single-crystal ferrite particles are provided of substantially isotropic shape containing iron and at least one kind of divalent metal other than iron, the ratio of the total number of iron atoms to the divalent metal atoms being at least 2 to 1 and the average particle size ranging from about 0.05 to 1.0 micron. The ferrite crystals are made by admixing an aqueous solution containing ferrous ions and the divalent metal ions with 0.55 to 3 mol equivalents, relative to acid in the solution, of an alkali to obtain a suspension of the hydroxides at a pH of more than 6.5 and thereafter bubbling an oxidizing gas into the suspension maintained at 60° C. to 90° C. until the hydroxides disappear and ferrite particles are formed.

U.S. Pat. No. 4,097,392 describes a manufacturing process for ferrimagnetic materials and pressure-compacted soft ferrite components utilizing a wet process for compositional preparation of materials in which metal carbonates and metal hydroxides are coprecipitated in controllably selected ratios. An aqueous solution of metal ions is formed by dissolving pure metals in acid. This aqueous metal ion solution is added to a predetermined solution of carbonate ions and hydroxide ions. Concentrations, temperature, and rates of addition are controlled to select the ratio of carbonate groups to hydroxide groups in the coprecipitated particles and the size of such particles. The controllably selected ratio of carbonate groups to hydroxide groups facilitates separation of the coprecipitation particles and maintains residual hydroxide groups in the material so as to extend solid-state reactivity of the coprecipitated particles for grain growth and densification purposes until the final heat treatment in which the pressure compacted articles are sintered.

In Bull. Amer. Ceram. Soc., 61(3), 362 (1982) and in Ferrites, Proc., ICF, 3rd [48TRAI] 1980 (Pub. 1982), 23–26, a process is described for the preparation of high performance ferrites from metal acetylacetonates. A solution of iron, zinc, and manganese acetylacetonates in ethanol is refluxed for one hour. The solution is treated with ammonium hydroxide to a pH level of 10–11, and the treated solution is refluxed two hours to precipitate solids. The solids are recovered, microwave dried, calcined for five hours at 500° C. under nitrogen, and then shaped and fired for another hour under nitrogen.

Journal of the Society of Powder and Powder Metallurgy, 29(5), 170 (1982) describes the preparation of crystalline $BaFe_2O_4$ and $BaFe_{12}O_{19}$ ferrites via an amorphous state by calcination of gels which are obtained by hydrolysis of a metal alkoxide mixture.

Other literature of interest relates to the production of conducting oxide powders by an "amorphous citrate" type process.

Science of Ceramics, Vol. 8, British Ceramic Society, Stoke-on-Trent, England (1976) describes the preparation of ferrite powders (e.g., $LiMnZnFe_2O_4$) suitable for memory cores, involving the pyrolysis of amorphous organometallic precursors obtained by evaporation of metallic salt solutions.

In Powder Metallurgy, 22, 14 (1979), conducting oxide powders are prepared by dehydration of citrate-nitrate gels at 70° C. to provide solid precursor materials, which are then pyrolyzed to yield a semiconducting composition such as lanthanum chromite doped with strontium. A similar procedure is employed to synthesize strontium-substituted lanthanum manganite perovskite powder as reported in Journal of Materials Science, 17, 2757 (1982).

There remains a need for new and improved processes for the production of fine grain inorganic oxide powders with electrical or magnetic properties such as ferrimagnetic spinel compositions.

Accordingly, it is an object of this invention to provide an improved procedure via an organometallic intermediate for the production of a ferrimagnetic spinel composition having an average particle size of less than about 1000 angstroms.

It is another object of this invention to provide a ferrimagnetic spinel composition having a ferrite crystal lattice structure of improved dimensional stability and strength, and which exhibits improved magnetic properties such as permeability and loss factor.

Other objects and advantages of the present invention shall become apparent from the accompanying description and example.

DESCRIPTION OF THE INVENTION

One or more objects of the present invention are accomplished by the provision of a process for the production of a microcrystalline ferrimagnetic spinel which comprises (1) forming an aqueous solution containing alpha-hydroxycarboxylate salts of nickel, zinc, and iron metals in quantities and with metal valences that subsequently yield a spinel composition corresponding to the formula:

$$M_1Fe_2O_4$$

where M is nickel, zinc, or a combination thereof; (2) removing the aqueous medium to provide a solid-phase spinel precursor; and (3) pyrolyzing the spinel precursor in the presence of molecular oxygen at a temperature in the range between about 300°–900° C. to form a $M_1Fe_2O_4$ spinel composition having an average particle size less than about 1000 angstroms.

It is an advantage of the invention process that the alpha-hydroxycarboxylate salt content of the step (1) aqueous solution can be above about 50 weight percent, based on total solution weight. The smaller volume of aqueous medium facilitates its removal in step (2) as compared to more dilute solutions.

The step (1) formation of the aqueous solution is achieved readily at room temperature, or with mild heating up to a temperature of about 30°–90° C.

The nickel, zinc and iron salts preferably are of water-soluble alpha-hydroxycarboxylic acids such as citric acid, malic acid, tartaric acid, glycolic acid, lactic acid and the like, which contain between about 1–3 hydroxyl groups and 1–3 carboxylic acid groups.

In step (2) of the process, the aqueous medium can be removed by any conventional procedure, such as evaporation, distillation, freeze-drying, and the like. The resultant residual material usually is in the form of a firm gel, depending on the water content that remains associated with the solid mass. If desired, the gel can be heated until it converts into a black char.

The gel or char obtained from step (2), i.e., the solid-phase spinel precursor, is then subjected to pyrolysis in the presence of molecular oxygen, e.g., in the presence of air. The pyrolysis is conducted at a temperature between about 300°–900° C., preferably between about 300°–500° C., for a period of about 0.1–2 hours until the conversion of spinel precursor to $M_1Fe_2O_4$ spinel is completed, and most preferably until the resultant $M_1Fe_2O_4$ spinel is substantially carbon free. Lower calcining temperatures (less than 500° C.) are feasible due to the high reactivity of the gel under pyrolysis conditions. Lower temperatures tend to suppress sintering and grain growth in the resultant spinel product.

Illustrative of a present invention spinel product is $Ni_{0.7}Zn_{0.3}Fe_2O_4$ which has an average particle size less than about 1000 angstroms.

In another embodiment, the present invention contemplates the inclusion of a surfactant in step (1) of the above described process. The surfactant is employed in a quantity between about 0.01–20 weight percent, preferably between about 1–15 weight percent, based on the alpha-hydroxycarboxylate salt content of the step (1) solution.

Illustrative of suitable surfactants are nonionic surface active agents such as sorbitan fatty acid esters, polyoxyethylene sorbitan fatty acid esters, polyoxyethylene sorbitol fatty acid esters, polyoxyethylene fatty acid esters, polyoxyethylene alcohol ethers, glycerine fatty acid esters, propylene glycol fatty acid esters, polyoxyethylene-castor oil derivatives, polyoxyethylene alkyl phenyl ethers, alkyl esters of phosphoric acid, polyoxyethylene esters of phosphoric acid, polyvinyl alcohol, and the like; anionic surface active agents such as salts of alkyl sulfates, salts of polyoxyethylene alkyl ether sulfate, salts of alkyl sulfosuccinates, N-acylsarcosine salts, fatty acid salts, homopolymers and copolymers of unsaturated carboxylic acids such as acrylic acid and maleic acid, and the like; and cationic surface active agents such as quaternary ammonium salts and pyridinium salts, and the like.

As demonstrated in Example II, the inclusion of a surfactant in the step (1) aqueous solution of alpha-hydroxycarboxylate salts has a beneficial effect on the properties of the ferrimagnetic spinel composition which is the resultant product of the invention process.

For example, the average particle size of the ferrite powder is less than about 1000 angstroms, with essentially no formation of larger particle agglomerates, e.g., particles having a particle size above about 1000 angstroms. In addition, the individual particles are approximately spherical in structure. This type of microcrystalline ferrite powder is excellent for application in the production of ferrite fibers, e.g., by the spinning of a dope composed of a suspension of the fine ferrite powder in polyvinyl alcohol. The present invention process has other advantages in comparison with prior art procedures for the production of ferrimagnetic spinel powders. The present invention process is amenable to the use of high purity starting materials.

By "high purity" is meant a mixture of nickel, zinc, and iron alpha-hydroxycarboxylate salts which contain less than about 0.1 weight percent of metals other than nickel, zinc and iron and which is substantially free of any anions other than alpha-carboxylic acids.

The use of high purity metal alpha-hydroxycarboxylate starting materials has important consequences with respect to the physical and magnetic properties of the ferrimagnetic spinel products. The presence of cationic and anionic impurities tends to affect adversely critical properties such as resistivity, magnetic permeability, magnetocrystalline anisotropy, and the like, of the ferrite powders.

Further, the presence of anions other than those of alpha-hydroxycarboxylic acids can have an undesirable influence on the chemistry of garnet, spinel, or perovskite formation. Powder Technology, 7, 21 (1973) describes the vacuum evaporation of a perovskite precursor solution which contains lactate and nitrate anions. A violent reaction occurs, with the release of large amounts of carbon dioxide and noxious vapors, indicating an extreme oxidative environment within the solution medium.

The following Examples are further illustrative of the present invention. The starting materials and other specific ingredients and processing parameters are presented as being typical, and various modifications can be derived in view of the foregoing disclosure within the scope of the invention.

EXAMPLE I

This Example illustrates a procedure for the synthesis of nickel-zinc ferrites in accordance with the present invention process.

Five kilograms of ferric citrate (16.95% by weight iron), 1360 grams of nickel citrate (23.15% by weight nickel), and 480 grams of zinc citrate (31.1% by weight zinc) are dissolved in 5–10 liters of hot water (90° C.). The reaction vessel is a mechanically-stirred beaker, open to the air. After all the citrates are dissolved to form a dark brownish-green solution, the water is evaporated to yield a gelatinous mass.

The gel is loaded into alumina boats and pyrolyzed at 500° C. for 15 minutes in a combustion tube purged with air. The product is a brown, ferrimagnetic powder weighing 1625 grams (90.6% of theoretical). The powder is ball-milled for about 0.5 hour to reduce in size any crystallite agglomerates of +200 mesh size.

The composition of the powder is $Ni_{0.7}Zn_{0.3}Fe_2O_4$. The x-ray diffraction pattern indicates that it is a pure phase spinel, without the presence of NiO, ZnO, $\alpha$-$Fe_2O_3$ or $\alpha$-Fe. The particle sizes are of a broad distribution, ranging between about 500–5000 angstroms in diameter, with most of the particles having a diameter of less than about 1000 angstroms in diameter.

EXAMPLE II

This Example illustrates an improved procedure for synthesis of nickel-zinc ferrites in accordance with the present invention process, with the inclusion of a surfactant constituent.

A 500 gram quantity of ferric citrate (16.95% by weight iron), 136 grams of nickel citrate (23.15% by weight nickel), and 48 grams of zinc citrate (31.1% by weight zinc) are mixed in 1000 grams of hot water (90° C.) in a beaker of open to the air, and mechanically stirred. A 50 gram quantity of polyvinyl alcohol (number average molecular weight, 14,000 g/mole) is dissolved in the solution to form a dark, green-brown syrup. The solution is stirred while the water is boiled off to yield a plastic gel. The gel is charged to alumina boats, which are then inserted into an oven purged with air and heated at about 500° C. for 15 minutes.

The resultant char is ground up in a ball mill for five minutes, then repyrolyzed under the same conditions. The resultant brown ferrimagnetic powder (154.6 grams, 86.2% of theoretical yield) passes through a 325 mesh screen.

Elemental analysis indicates a stoichiometry of $Ni_{0.7}Zn_{0.3}Fe_2O_4$. X-ray diffraction establishes that only pure spinel phase is present, without any detectable content of NiO, ZnO, $\alpha$-$Fe_2O_3$ or $\alpha$-Fe. Scanning electron microscopy indicates that the powder particulates have a narrow size distribution ranging between about 500–2000 angstroms in diameter. There are essentially no agglomerates present. Most of the particulates are less than about 1000 angstroms in diameter, and are approximately spherical in shape.

The original metal citrate constituents as described above are substantially free of any metals other than nickel, zinc, and iron (i.e., less than about 0.1 weight percent metal impurities).

What is claimed is:

1. A process for the production of a microcrystalline ferrimagnetic spinel which comprises (1) forming an aqueous solution containing a surfactant and water-soluble alpha-hydroxycarboxylate salts of nickel, zinc and iron metals in quantities and with metal valences that subsequently yield a spinel composition corresponding to the formula:

$$M_1Fe_2O_4$$ 

where M is nickel, zinc, or a combination thereof; (2) removing the aqueous medium to provide a solid-phase spinel precursor; and (3) pyrolyzing the spinel precursor in the presence of molecular oxygen at a temperature in the range between about 300°–900° C. to form a $M_1Fe_2O_4$ spinel composition having an average particle size less than about 1000 angstroms.

2. A process in accordance with claim 1 wherein the alpha-hydroxycarboxylate salt content of the step (1) aqueous solution is above about 50 weight percent, based on total solution weight.

3. A process in accordance with claim 1 wherein the alpha-hydroxycarboxylate salt content contains less than about 0.1 weight percent of metal salts other than those of nickel, zinc and iron metals.

4. A process in accordance with claim 1 wherein the alpha-hydroxycarboxylate in step (1) is citrate.

5. A process in accordance with claim 1 wherein the alpha-hydroxycarboxylate in step (1) is malate.

6. A process in accordance with claim 1 wherein the alpha-hydroxycarboxylate in step (1) is tartrate.

7. A process in accordance with claim 1 wherein the alpha-hydroxycarboxylate in step (1) is lactate.

8. A process in accordance with claim 1 wherein the alpha-hydroxycarboxylate in step (1) is glycolate.

9. A process in accordance with claim 1 wherein the solid-phase spinel precursor produced in step (2) is in the form of a gel.

10. A process in accordance with claim 1 wherein the pyrolysis in step (3) is at a temperature between about 300°–900° C. for a period between about 0.1–2 hours until the conversion of spinel precursor to $M_1Fe_2O_4$ spinel is completed.

11. A process in accordance with claim 1 wherein the pyrolysis in step (3) is conducted until the resultant $M_1Fe_2O_4$ spinel is substantially carbon free.

12. A process in accordance with claim 1 wherein the spinel product has a $Ni_{0.7}Zn_{0.3}Fe_2O_4$ composition.

* * * * *